United States Patent
Kirillov

(10) Patent No.: US 9,536,011 B1
(45) Date of Patent: Jan. 3, 2017

(54) APPLYING STRING MATCHING ALGORITHMS TO FINDING AD UNIT AVAILABILITY INTERVAL

(71) Applicant: Google Inc., Mountain View, CA (US)

(72) Inventor: Roman Kirillov, London (GB)

(73) Assignee: Google Inc., Mountain View, CA (US)

( * ) Notice: Subject to any disclaimer, the term of this patent is extended or adjusted under 35 U.S.C. 154(b) by 274 days.

(21) Appl. No.: 14/461,633

(22) Filed: Aug. 18, 2014

(51) Int. Cl.
*G06F 17/00* (2006.01)
*G06F 17/30* (2006.01)
*G06Q 30/02* (2012.01)
*G06F 17/21* (2006.01)

(52) U.S. Cl.
CPC ....... *G06F 17/3089* (2013.01); *G06Q 30/0277* (2013.01); *G06F 17/21* (2013.01)

(58) Field of Classification Search
CPC .............................. G06F 17/21; G06F 17/211
USPC .................................................. 715/200, 255
See application file for complete search history.

(56) References Cited

U.S. PATENT DOCUMENTS

| | | | | |
|---|---|---|---|---|
| 5,929,421 | A * | 7/1999 | Cherry | G06K 7/14 235/462.01 |
| 6,192,362 | B1 * | 2/2001 | Schneck | H04L 61/1523 |
| 6,618,504 | B1 * | 9/2003 | Yoshino | G06K 9/00449 178/18.01 |
| 7,376,588 | B1 * | 5/2008 | Gregov | G06Q 30/0603 705/27.1 |
| 2002/0174105 | A1 * | 11/2002 | De La Huerga | G06F 17/22 |
| 2005/0193015 | A1 * | 9/2005 | Logston | G06F 17/30058 |
| 2008/0140530 | A1 * | 6/2008 | Van Luchene | G06Q 30/02 705/14.54 |
| 2008/0276312 | A1 * | 11/2008 | Kawai | G06F 21/6281 726/18 |
| 2010/0257553 | A1 * | 10/2010 | Yuen | G06Q 30/02 725/36 |
| 2013/0117246 | A1 * | 5/2013 | Cabaniols | G06F 17/2211 707/697 |
| 2014/0052436 | A1 * | 2/2014 | Qian | G06F 17/2223 704/9 |

(Continued)

OTHER PUBLICATIONS

Decker et al., Modeling Information Agents: Advertisements, Organizational Roles, and Dynamic Behavior, AAAI 1996, pp. 9-16.*

(Continued)

*Primary Examiner* — Cong-Lac Huynh
(74) *Attorney, Agent, or Firm* — Foley & Lardner LLP; John D. Lanza

(57) ABSTRACT

Methods and systems for identifying availability of a content unit are described. Processors receive a request to reserve inventory of a content unit for a contiguous set of time units within a date range. The processors generate a request string including a first plurality of characters corresponding to a position in the request string and having a character value. The processors generate an inventory string including a second plurality of characters corresponding to a position in the inventory string and having a character value. The processors determine a substring of the inventory string that includes an equal number of characters as the request string and each character of the substring has a character value that is equal to or greater than a character value of a corresponding character of the request string. The processors display dates corresponding to the substring.

20 Claims, 5 Drawing Sheets

(56) References Cited

U.S. PATENT DOCUMENTS

| | | | | |
|---|---|---|---|---|
| 2014/0149232 A1* | 5/2014 | Ringdahl | ........... | G06Q 30/0273 |
| | | | | 705/14.71 |
| 2015/0020172 A1* | 1/2015 | Bohnenberger | .. | G06F 17/30595 |
| | | | | 726/5 |
| 2015/0025877 A1* | 1/2015 | Ueno | .................... | G06F 3/0237 |
| | | | | 704/9 |

OTHER PUBLICATIONS

Faro et al., Fast and Flexible Packed String Matching, Elsevier Jul. 2014, pp. 61-72.*

Liddle et al., Automatically Extracting Structure and Data from Business Reports, ACM 1999, pp. 86-93.*

BestSolveError, Search Room Availability Bookings Phpmysql, searched via internet at http://www.bestsolveerror.com/1380101/search-room-availability-bookings-phpmysql/ on Jul. 21, 2014, 10 pgs.

Drupal: Partial availability, searched via internet at https://www.drupal.org/node/801198 on Jul. 21, 2014, 3 pgs.

Stackoverflow—A Database Architecture and Algorithm to Support Querying for Availability over a Week, searched via internet at http://stackoverflow.com/questions/16289303/a-database-architecture-and-algorithm-to-support-querying-for-availability-over on Jul. 21, 2014, 1 pg.

Stackoverflow—Solr Search for Room Availability and Sort by Results, searched via internet at http://stackoverflow.com/questions/12929108/solr-search-for-room-availability-and-sort-by-result, on Jul. 21, 2014, 2 pgs.

StackOverFlow, Is it Possible or Wise to Use Solr for a Reservation System, searched via internet at http://stackoverflow.com/questions/15473528/is-it-possible-or-wise-to-use-solr-for-a-reservation-system on Jul. 21, 2014, 2 pgs.

* cited by examiner

APPLYING STRING MATCHING ALGORITHMS TO FINDING AD UNIT AVAILABILITY INTERVAL

BACKGROUND

In a direct content placement campaign that allows for direct placement of content items, such as creatives, a content provider can reserve a content slot of an information resource of a content publisher such that each time the information resource is served, a creative of the content provider is provided for display within the content slot of the information resource.

SUMMARY

According to one aspect, a method for identifying availability of a content unit for a contiguous set of time units is described. A data processing system including one or more processors can receive a request to reserve inventory of a content unit for a contiguous set of time units within a given date range. The request identifies the date range and a reservation size value for each time unit corresponding to a size of a portion of the time unit to reserve. The data processing system can generate, from the request, a request string including a first plurality of characters. Each character of the first plurality of characters corresponds to a position in the request string and has a character value. The position corresponds to a respective time unit of the contiguous set of time units and the character value corresponds to the reservation size value associated with the time unit to which the character corresponds. The data processing system can generate, from an availability schedule of the content unit, an inventory string including a second plurality of characters. Each character of the second plurality of characters corresponds to a position in the inventory string and has a character value. The position in the inventory string corresponds to a respective time unit of the date range and the character value represents a size of an available portion of the time unit. The data processing system can determine a substring of the inventory string that includes an equal number of characters as the request string and each character of the substring has a character value that is equal to or greater than a character value of a corresponding character of the request string. The data processing system can provide, for display, dates corresponding to the substring.

In some implementations, generating the request string from the request includes assigning, to each time unit, a character corresponding to the reservation size value of the time unit.

In some implementations, the length of the inventory string is equal to a number of time units within the date range. Each of the characters of the inventory string can correspond to a time unit within the date range.

In some implementations, generating, from an availability schedule of the content unit, an inventory string including a second plurality of characters includes identifying, for each time unit in the date range, a size of an available portion of the time unit that and assigning a character corresponding to the size of the available portion of the time unit.

In some implementations, determining a substring of the inventory string includes identifying a first character of the request string, determining a first character value corresponding to the first character of the request string and determining a first character of the inventory string of the inventory string having a character value that is equal to or greater than the first character value.

In some implementations, the data processing system can identify, for each subsequent character of the request string, a character value corresponding to the subsequent character of the request string. The data processing system can determine, for the subsequent character of the request string, a corresponding character of the inventory string of the inventory string based on a position of the character of the inventory string relative to the first character of the inventory string. The data processing system can determine, for the corresponding character of the inventory string, a character value that is equal to or greater than the character value of the character of the request string to which the character of the inventory string corresponds based on a position of the character of the request string relative to the first character of the request string.

In some implementations, providing, for display, dates corresponding to the substring includes identifying a first date corresponding to the first character of the substring and providing, for display, the first date that is within the given date range.

According to another aspect, a system for identifying availability of a content unit for a contiguous set of time units is described. The system includes a data processing system including a memory storing processor-executable instructions and a processor configured to execute the processor-executable instructions. The processor is configured to receive a request to reserve inventory of a content unit for a contiguous set of time units within a given date range. The request identifies the date range and a reservation size value for each time unit corresponding to a size of a portion of the time unit to reserve. The processor is configured to generate, from the request, a request string including a first plurality of characters. Each character of the first plurality of characters corresponds to a position in the request string and has a character value. The position corresponds to a respective time unit of the contiguous set of time units and the character value corresponds to the reservation size value associated with the time unit to which the character corresponds. The processor is configured to generate, from an availability schedule of the content unit, an inventory string including a second plurality of characters. Each character of the second plurality of characters corresponds to a position in the inventory string and has a character value. The position in the inventory string corresponds to a respective time unit of the date range and the character value represents a size of an available portion of the time unit. The processor is configured to determine a substring of the inventory string that includes an equal number of characters as the request string and each character of the substring has a character value that is equal to or greater than a character value of a corresponding character of the request string. The processor is configured to provide, for display, dates corresponding to the substring.

In some implementations, to generate the request string from the request, the processor is configured to assign, to each time unit, a character corresponding to the reservation size value of the time unit.

In some implementations, the length of the inventory string is equal to a number of time units within the date range. Each of the characters of the inventory string can correspond to a time unit within the date range.

In some implementations, to generate, from an availability schedule of the content unit, an inventory string including a second plurality of characters, the processor is configured to identify, for each time unit in the date range, a size of an available portion of the time unit that and assign a character corresponding to the size of the available portion of the time unit.

In some implementations, to determine a substring of the inventory string, the processor is configured to identify a first character of the request string, determine a first character value corresponding to the first character of the request string and determine a first character of the inventory string of the inventory string having a character value that is equal to or greater than the first character value.

In some implementations, the processor is configured to identify, for each subsequent character of the request string, a character value corresponding to the subsequent character of the request string. The processor is configured to determine, for the subsequent character of the request string, a corresponding character of the inventory string of the inventory string based on a position of the character of the inventory string relative to the first character of the inventory string. The processor is configured to determine, for the corresponding character of the inventory string, a character value that is equal to or greater than the character value of the character of the request string to which the character of the inventory string corresponds based on a position of the character of the request string relative to the first character of the request string.

In some implementations, to provide, for display, dates corresponding to the substring, the processor is configured to identify a first date corresponding to the first character of the substring and provide, for display, the first date that is within the given date range.

According to another aspect, a computer readable storage medium having computer-executable instructions to identify availability of a content unit for a contiguous set of time units is described. The computer-executable instructions include instructions to receive a request to reserve inventory of a content unit for a contiguous set of time units within a given date range. The request identifies the date range and a reservation size value for each time unit corresponding to a size of a portion of the time unit to reserve. The computer-executable instructions include instructions to generate, from the request, a request string including a first plurality of characters. Each character of the first plurality of characters corresponds to a position in the request string and has a character value. The position corresponds to a respective time unit of the contiguous set of time units and the character value corresponds to the reservation size value associated with the time unit to which the character corresponds. The computer-executable instructions include instructions to generate, from an availability schedule of the content unit, an inventory string including a second plurality of characters. Each character of the second plurality of characters corresponds to a position in the inventory string and has a character value. The position in the inventory string corresponds to a respective time unit of the date range and the character value represents a size of an available portion of the time unit. The computer-executable instructions include instructions to determine a substring of the inventory string that includes an equal number of characters as the request string and each character of the substring has a character value that is equal to or greater than a character value of a corresponding character of the request string. The computer-executable instructions include instructions to provide, for display, dates corresponding to the substring.

In some implementations, generating the request string from the request includes assigning, to each time unit, a character corresponding to the reservation size value of the time unit.

In some implementations, the length of the inventory string is equal to a number of time units within the date range. Each of the characters of the inventory string can correspond to a time unit within the date range.

In some implementations, generating, from an availability schedule of the content unit, an inventory string including a second plurality of characters includes identifying, for each time unit in the date range, a size of an available portion of the time unit that and assigning a character corresponding to the size of the available portion of the time unit.

In some implementations, determining a substring of the inventory string includes identifying a first character of the request string, determining a first character value corresponding to the first character of the request string and determining a first character of the inventory string of the inventory string having a character value that is equal to or greater than the first character value.

In some implementations, providing, for display, dates corresponding to the substring includes identifying a first date corresponding to the first character of the substring and providing, for display, the first date that is within the given date range.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
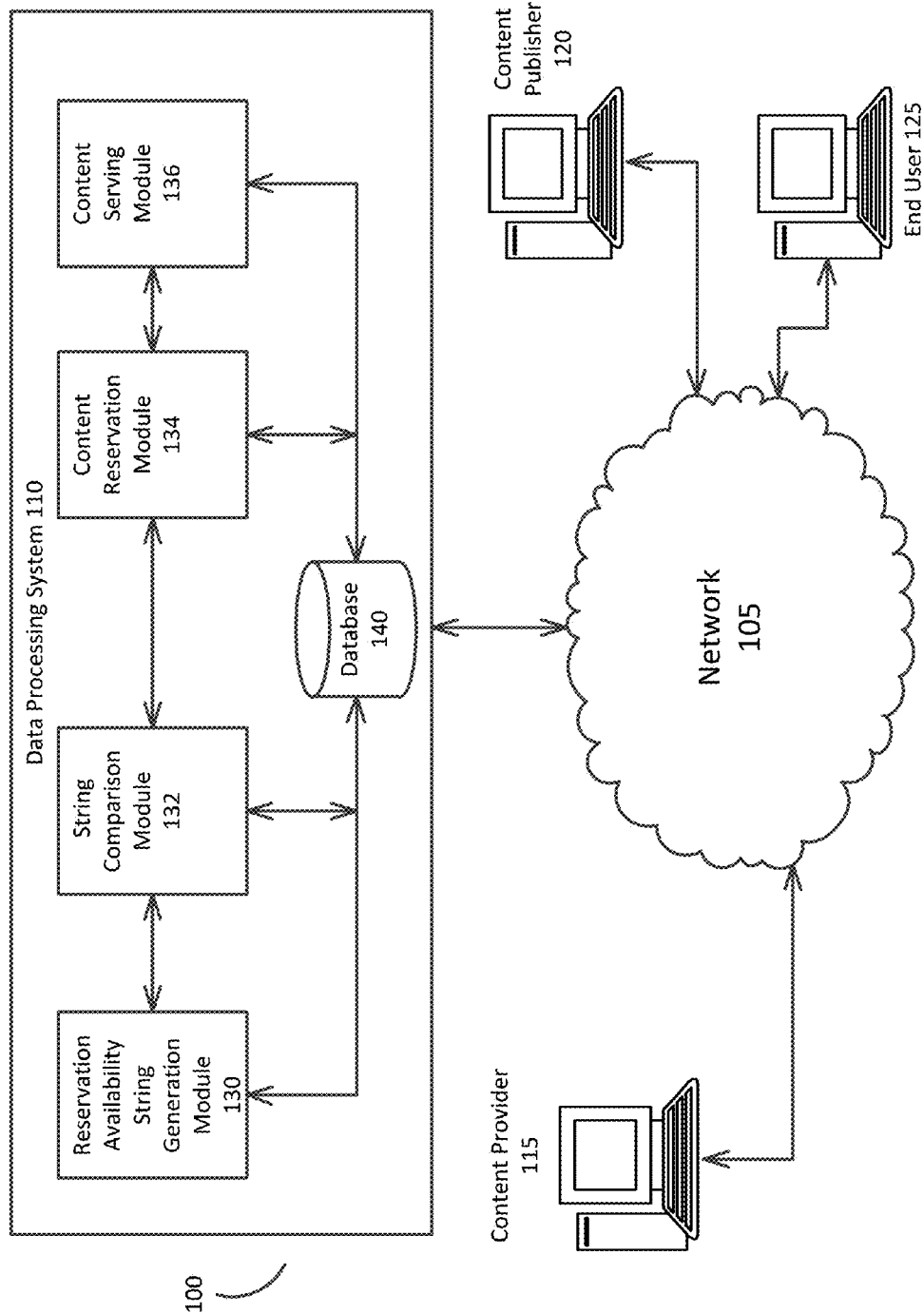
FIG. 1 is a block diagram depicting one implementation of an environment for identifying availability of a content unit for a contiguous set of time units, according to an illustrative implementation.

Following below are more detailed descriptions of various concepts related to, and implementations of, methods, apparatuses, and systems for identifying availability of a content unit for a contiguous set of time units. The various concepts introduced above and discussed in greater detail below may be implemented in any of numerous ways, as the described concepts are not limited to any particular manner of implementation. Examples of specific implementations and applications are provided primarily for illustrative purposes.

A content provider, such as an advertiser, can serve ads on some webpages by participating in auctions. The advertiser can serve ads on other webpages by reserving ad units. An ad unit is a unit of inventory available on a publisher's webpage. The ad unit can correspond to a content slot within which an ad may be inserted. In direct campaigns, a content publisher may sell some of the inventory to an advertiser for a premium price on an exclusive or semi-exclusive basis. In an exclusive basis, each time the webpage receives an impression, an ad of the advertiser is displayed such that the advertiser's ads receive a 100% impression rate. In a semi-exclusive basis, an advertiser's ads only receive a percentage of the total number of webpage impressions based on the percentage of impressions the advertiser purchased from the publisher. The availability of an ad unit corresponds to a percentage of impressions for which no advertiser has reserved the ad unit. For instance, if an advertiser buys 70% of an ad unit's inventory, the ad unit's availability is 30%. When an ad unit is not completely sold, the remaining availability of the given ad unit may be sold provided that the requested share of impressions is less or equal to ad unit's availability.

An advertiser interested in reserving an ad unit to show advertisements can select an interval for which the advertiser wants to show advertisements in the ad unit. In some circumstances, it is not easy to find an interval of the requested length, especially if the ad unit has been previously booked by other advertisers. The present disclosure aims to assist an advertiser in finding an ad unit available for purchase that satisfies the availability criteria of an advertiser. The availability criteria may include one or more availability parameters. Examples of availability parameters can include a minimum availability of the ad unit (e.g. 50%), a desired length of the interval (e.g. 7 days), one or more date limitations (e.g. before September 1st but after June 15th), among others.

To produce strict match, a modified substring matching algorithm can be utilized to identify dates that match the availability criteria of the advertiser. For this, each ad unit can have an availability value $A_{at}$, which represents the availability of an ad unit a at time period t. Each $A_{at}$ can be represented as a letter of some alphabet. For example, if a given ad unit availability is 0, 0, 0, 50, 50, 50, 75, 75, 75, 100, 100, 100 for some interval of dates, this will correspond to a string AAABBBCCCDDD where A is 0% availability, B is 50%, C is 75% and D is 100%. Suppose an advertiser is looking to buy 75% impressions for the period of 5 days, this can be represented as a string CCCCC.

Normal string matching algorithms will not be able to find this since the longest consecutive interval of letter C only consists of 3 days. However, in the present case, there is a valid solution with an interval starting on day 7 (first letter C). To facilitate this, a character equality rule in a string matching algorithm can be redefined as: $c_i = c_j$ iff $A(c_i) \geq A(c_j)$, where $c_i$ is the character of the inventory string (haystack in terms of string matching), $c_j$ is a character of a request string corresponding to the request to lookup availability (needle) and function A is a non-negative function which maps character to its availability in percent. That is, an inventory character is considered equal to the request character if and only if the availability associated with the inventory character is more than or equal to the required availability of the request character.

Certain string matching algorithms, such as a naive string matching algorithm or well-known Knuth-Morris-Pratt algorithm can be applied with a re-defined character equality operator. It should be noted that string matching algorithms that rely on string hashing will not work.

Aspects of the present disclosure relate to methods and systems for identifying availability of a content unit for a contiguous set of time units are described. A data processing system including one or more processors can receive a request to reserve inventory of a content unit for a contiguous set of time units within a given date range. The request identifies the date range and a reservation size value for each time unit corresponding to a size of a portion of the time unit to reserve. The data processing system can generate, from the request, a request string including a first plurality of characters. Each character of the first plurality of characters corresponds to a position in the request string and has a character value. The position corresponds to a respective time unit of the contiguous set of time units and the character value corresponds to the reservation size value associated with the time unit to which the character corresponds. The data processing system can generate, from an availability schedule of the content unit, a inventory string including a second plurality of characters. Each character of the second plurality of characters corresponds to a position in the inventory string and has a character value. The position in the inventory string corresponds to a respective time unit of the date range and the character value represents a size of an available portion of the time unit. The data processing system can determine a substring of the inventory string that includes an equal number of characters as the request string and each character of the substring has a character value that is equal to or greater than a character value of a corresponding character of the request string. The data processing system can provide, for display, dates corresponding to the substring.

FIG. 1 is a block diagram depicting one implementation of an environment for identifying availability of a content unit for a contiguous set of time units. The environment 100 includes at least one data processing system 110. The data processing system 110 can include at least one processor and a memory, i.e., a processing circuit. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The data processing system can include one or more computing devices or servers that can perform various functions. In some implementations, the data processing system can include an advertising auction system configured to host auctions. In some implementations, the data processing system does not include the advertising auction system but is configured to communicate with the advertising auction system via the network 105.

The network 105 can include computer networks such as the internet, local, wide, metro or other area networks, intranets, satellite networks, other computer networks such as voice or data mobile phone communication networks, and combinations thereof. The data processing system 110 of the system 100 can communicate via the network 105, for instance with at least one content provider computing device 115, at least one content publisher computing device 120, or at least one end user computing device 125. The network 105 may be any form of computer network that relays information between the user computing device 115, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CAT5 cable, etc.) to other computing devices in network 105.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one reservation availability string generation module 130, at least one string comparison module 132, at least one content reservation module 134, at least one content serving module 136 and at least one database 140.

The reservation availability string generation module 130, the string comparison module 132, the content reservation module 134 and the content serving module 136 can each include at least one processing unit, server, virtual server, circuit, engine, agent, appliance, or other logic device such as programmable logic arrays configured to communicate with the database 140 and with other computing devices (e.g., the content provider computing device 115, the content publisher computing device 120, or the end user computing device 125) via the network 105.

The reservation availability string generation module 130, the string comparison module 132, the content reservation module 134 and the content serving module 136 can include or execute at least one computer program or at least one script. The reservation availability string generation module 130, the string comparison module 132, the content reservation module 134 and the content serving module 136 can be separate components, a single component, or part of the data processing system 110. The reservation availability string generation module 130, the string comparison module 132, the content reservation module 134 and the content serving module 136, can include combinations of software and hardware, such as one or more processors configured to execute one or more scripts to receive a request to reserve inventory of a content unit for a contiguous set of time units within a given date range, generate, from the request, a request string including a first plurality of characters, each character of the first plurality of characters corresponding to a position in the request string and having a character value, generate, from an availability schedule of the content unit, a inventory string including a second plurality of characters, each character of the second plurality of characters corresponding to a position in the inventory string and having a character value, determine a substring of the inventory string that includes an equal number of characters as the request string and each character of the substring having a character value that is equal to or greater than a character value of a corresponding character of the request string, and provide, for display, dates corresponding to the substring.

The data processing system can also include one or more content repositories or databases 140. The databases 140 can be local to the data processing system 110. In some implementations, the databases 140 can be remote to the data processing system 110 but can communicate with the data processing system 110 via the network 105. The databases 140 can store reservations for a plurality of content slots available for reservation on a plurality of information resources as well as store availability schedules for the plurality of content slots. Additional details of the contents of the databases 140 will be provided below.

The content provider computing devices 115 can include servers or other computing devices operated by a content provider entity to provide content items such as advertisements for display on information resources at the end user computing device 125. The content provided by the content provider computing device 115 can include third party content items or creatives (e.g., ads) for display on information resources such as a website or web page that includes primary content, e.g. content provided by the content publisher computing device 120. The content items can also be displayed on a search results web page. For instance, the content provider computing device 115 can provide or be the source of ads or other content items for display in content slots of content web pages such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other end user computing device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing devices 115. For instance, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115.

The end user computing devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The end user computing device 125, the content provider computing device 115, and the content publisher computing device 120 can include desktop computers, laptop computers, tablet computers, smartphones, personal digital assistants, mobile devices, end user computing devices, consumer computing devices, servers, clients, and other computing devices. The end user computing device 125, the content provider computing device 115, and the content publisher computing device 120 can include user interfaces such as microphones, speakers, touchscreens, keyboards, pointing devices, a computer mouse, touchpad, or other input or output interfaces.

The content provider computing devices 115, the content publisher computing devices 120 and the end user computing devices 125 may be any number of different user electronic devices, for example, a laptop computer, a desktop computer, a tablet computer, a smartphone, a digital video recorder, a set-top box for a television, a video game console, or any other computing device configured to communicate via the network 105. The content provider computing devices 115, the content publisher computing device 120 and the end user computing devices 125 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider computing devices 115, the content publisher computing devices 120 and the end user computing devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the end user computing devices 125 (e.g., a built-in display, microphone, etc.) or external to the housing of content provider computing devices 115, the content publisher computing device 120 and the end user computing devices 125 (e.g., a monitor connected to the user computing device 115, a speaker connected to the user computing device 115, etc.), according to various implementations. For example, the content provider computing devices 115, the content publisher computing device 120 and the end user computing devices 125 may include an electronic display, which visually displays web pages using webpage data received from one or more content sources and/or from the data processing system 110 via the network 105. In some implementations, a content placement campaign manager or third-party content provider, such as an advertiser, can communicate with the data processing system 110 via the content provider computing devices 115. In some implementations, the advertiser can communicate with the data processing system 110 via a user interface displayed on the user interface devices of the content provider computing devices 115.

Figure 2:
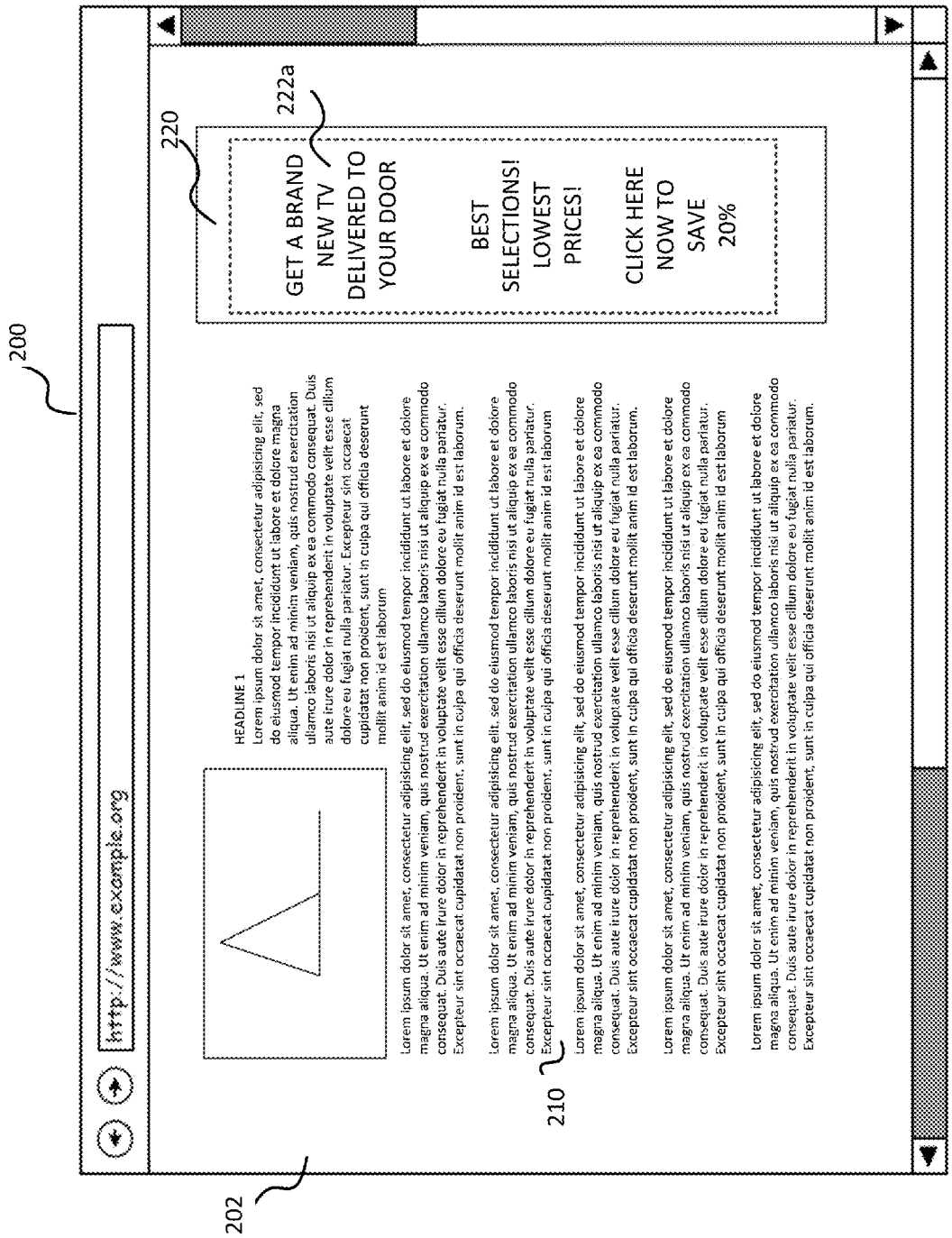
FIG. 2 shows a conceptual illustration of an example of an information resource including a content slot that can be reserved via the system depicted in FIG. 1.

Referring briefly to FIG. 2, FIG. 2 shows a conceptual illustration of an example of an information resource including a content unit that can be reserved via the system depicted in FIG. 1. A user interface 200 includes an information resource 202 that includes primary content 210 and at least one content unit 220 that can contain a third-party content item, such as a creative or an advertisement. A content publisher of the information resource 202 can select the content unit to participate in a direct advertising campaign in which the content publisher can allow one or more third-party content providers the ability to reserve the content unit 220 for serving content items provided by the third-party content providers.

In some implementations, one or more third-party content providers can reserve inventory of a content unit, such as the content unit 220 over a given time period. The inventory of a content unit corresponds to a number of impressions of the information resource of which the content unit is a part. For example, if the information resource receives 10,000 impressions over a given time period, the inventory of the content unit is 10,000. A third-party content provider can reserve the entire inventory of the content unit 220 for the given time period, or reserve a portion of the inventory of the content unit 220 for the given time period. In some implementations, the size of the portion of the inventory of the content unit 220 that the third-party can reserve can vary. In some implementations, the third-party content provider can reserve anywhere from 1%-100% of the entire inventory for a given time period. In some implementations, a first third-party content provider can reserve any portion of the entire inventory for the given time period, while subsequent third-party content providers can only reserve up to a remaining amount of the entire inventory for the given time period. In some implementations, when a third-party content provider reserves, for instance, 50% of the entire inventory for the given time period, the content unit will display a third-party content item of the third-party content provider on every second impression. The content unit can display a third-party content item selected via an auction process during the impressions of the web page when the third-party content item of the third-party content provider is not displayed.

Figure 3:
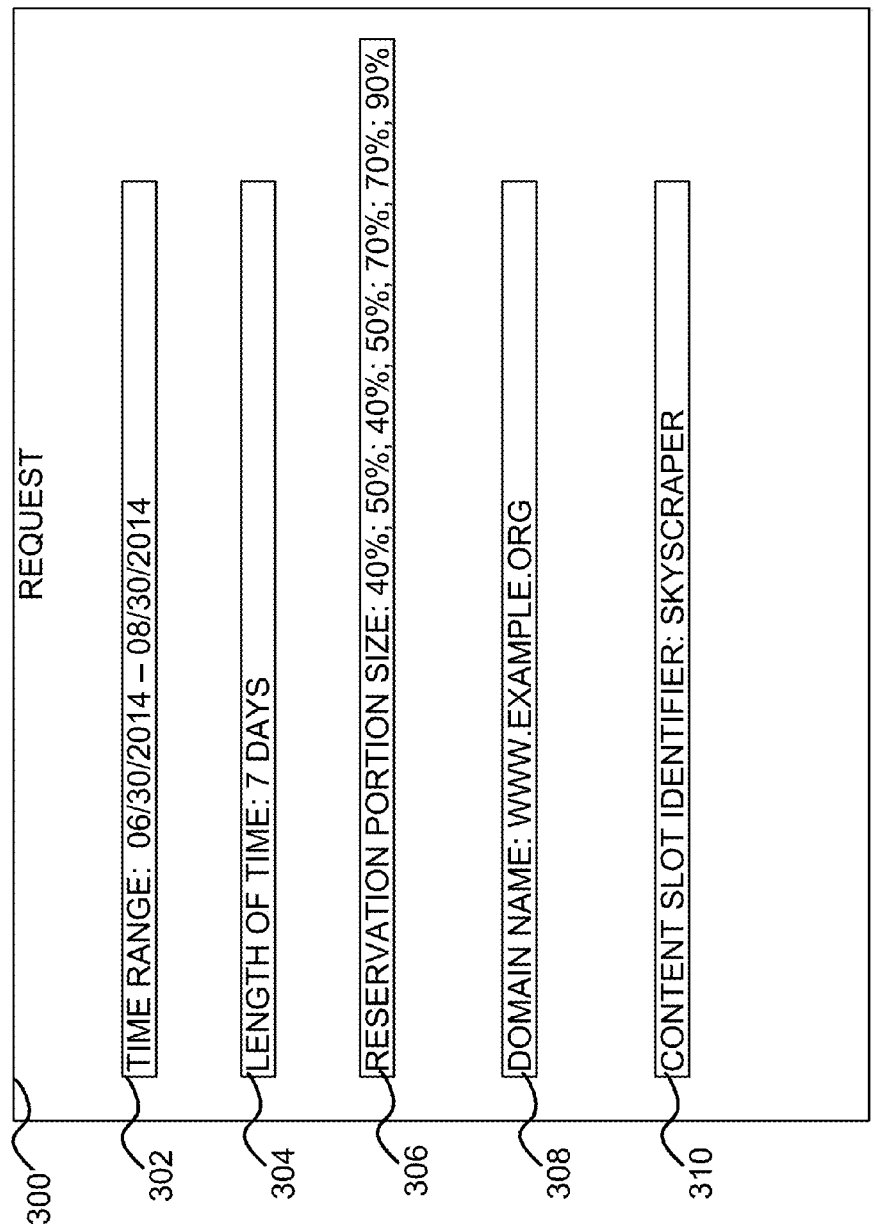
FIG. 3 shows a conceptual illustration of a user interface through which a third-party content provider can submit a request to identify a content slot that is available for reservation.

FIG. 3 shows a conceptual illustration of a user interface through which a third-party content provider can submit a request to identify a content slot that is available for reservation. In some implementations, the request 300 can include a time range field 302 corresponding to a time period within which to identify a content unit to reserve. The request can also include a length of time field 304 corresponding to a number of time units for which to reserve the content unit. In some implementations, each time unit can have a length of one day. In some implementations, the granularity of the time unit can vary, from one minute, to one hour, to one day, to one week, to one month, among others. The request 300 can also include a reservation portion size field 306 corresponding to a size of a portion of the content unit's inventory for a particular time unit. In some implementations, the reservation portion size field 306 can include values corresponding to one or more time units. For example, the reservation portion size field 306 includes a value of 40%, 50%, 40%, 50%, 70%, 70% and 90%. In some implementations, based on this field, the request indicates that 40% of the first and third time units are to be reserved, 50% of the second and fourth time units are to be reserved, 70% of the fifth and sixth time units are to be reserved and 90% of the seventh time unit is to be reserved. In some implementations, the reservation portion size field 306 can include a single value that corresponds to all of the time units to be reserved. The request 300 can also identify the domain name or URL of the information resource on which to reserve the content slot via the domain name field 308. The request 300 can also include a content slot identifier field 310 identifying the content slot to reserve.

Referring again to FIG. 1, the reservation availability string generation module 130 can be designed, configured or constructed to receive a request to identify availability of inventory of a content unit for a contiguous set of time units within a given date range. As described above, the request can include one or more request parameters, including values corresponding to one or more of a time range field, a length of time field, a reservation portion size field, a domain name field and a content slot identifier field, among others. The request can be generated in response to receiving inputs via a user interface.

The reservation availability string generation module 130 can be configured to generate, from the request, a request string including a first plurality of characters. In some implementations, each character of the first plurality of characters may correspond to a position in the request string and may have a character value. In some implementations, the position of a character may correspond to a respective time unit of the contiguous set of time units. In some implementations, the character value may correspond to the reservation size value associated with the time unit to which the character corresponds.

In some implementations, the reservation availability string generation module 130 can assign, to each time unit, a character corresponding to the reservation size value of the time unit. For instance, depending on the granularity, the reservation portion size may assign a character value of A to a reservation portion size value of 10%, a character value of B to a reservation portion size value of 20%, a character value of C to a reservation portion size value of 30%, and so forth. In some implementations, the character values can be case sensitive. In some implementations, the character values can be numbers, symbols, among others. In some implementations, the character values can be selected from a-z, A-Z, 0-9, among other symbols and characters. Using the request depicted in FIG. 3, the reservation availability string generation module 130 can generate a request string "DEDEGGI," where each character D, E, D, E, G, G and I corresponds to the first, second, third, fourth, fifth, sixth and seventh time unit and the character value of D corresponds to 40%, the character value of E corresponds to 50%, the character value G corresponds to 70% and the character value of I corresponds to 90% of the inventory for a given time unit. The position of each character matches the position of the time unit of the request.

The reservation availability string generation module 130 can be configured to generate, from an availability schedule of the content unit, a inventory string including a second plurality of characters. Each character of the second plurality of characters may correspond to a position in the inventory of string. Each character of the second plurality of characters may also have a character value. The character value corresponds to a portion of the time unit that is available to be reserved. For instance, if a time unit has a value of D, 40% of the inventory of the time unit is available to be reserved, while 60% of the inventory of the time unit is unavailable. Similarly, if a time unit has a value of G, 70% of the inventory of the time unit is available to be reserved, while 30% of the inventory of the time unit is unavailable.

In some implementations, the reservation availability string generation module 130 can generate a reservation availability string that has a string length that is equal to the number of time units within the time range identified in the request. Each character in the reservation availability string can correspond to a particular time unit. In some implementations, the characters in the reservation availability string are positioned based on the temporal order of the time units to which the characters correspond. For instance, the first character corresponds to the first time unit within the time range, while the last character corresponds to the last time unit within the time range. To generate the reservation availability string, the reservation availability string generation module 130 can identify, for each time unit, a reservation availability of the time unit. In some implementations, the reservation availability string generation module 130 can identify the availability of inventory of the time unit by looking up a database that maintains the inventories of time units of a content slot. Upon determining the availability of inventory of a given time unit, the reservation availability string generation module 130 can assign a character corresponding to a reservation size value of the time unit. The reservation size value of the time unit is the size of the inventory of the time unit available to be reserved. The reservation availability string generation module 130 can assign a character for each time unit within the time range included in the request. In this way, the reservation availability string generation module 130 can generate the reservation availability string that has a string length that is equal to the number of time units within the time range identified in the request and each character in the reservation availability string indicates a size of inventory of the time unit available to be reserved.

The string comparison module 132 can be designed, configured or constructed to determine a substring of the inventory string that includes an equal number of characters as the request string and each character of the substring has a character value that is equal to or greater than a character value of a corresponding character of the request string.

In some implementations, the string comparison module 132 can identify a first character of the request string. The string comparison module 132 can determine a character value corresponding to the first character of the request string. The string comparison module 132 can then determine, from the generated inventory string, the first character of the generated inventory string that has a character value that is equal to or greater than the first character value. In some implementations, the string comparison module 132 can determine the first character of the generated inventory string that has a character value that is equal to or greater than the first character value using an iterative process. The iterative process entails determining a first character of the inventory string, determining the character value of the determined character of the inventory string and comparing the determined character value with the character value of the first character of the request string, and repeating this for each subsequent character of the inventory string in the inventory string until the character value of the character of the inventory string has a character value that is equal to or greater than the character value of the first character of the request string.

In some implementations, after the string comparison module 132 identifies the first character of the inventory string that has a character value that is equal to or greater than the character value of the first character of the request string, the string comparison module 132 identifies the subsequent character of the inventory string adjacent to the first character of the inventory string. The string comparison module 132 compares the character value of the subsequent character of the inventory string to a character value of the second character value of the request string. If the string comparison module 132 determines that the character value of the subsequent character of the inventory string is equal to or greater than the character value of the second character value of the request string, the string comparison module 132 repeats the steps of identifying the subsequent character of the inventory string adjacent to the most recently identified character of the inventory string, comparing the character value of the subsequent character of the inventory string to a character value of the corresponding character value of the request string and determining that the character value of the subsequent character of the inventory string is equal to or greater than the character value of the corresponding character value of the request string. The string comparison module 132 repeats these steps until all of the characters of the request string have been compared or in the event that one of the character values of a character of the request string is greater than a character value of a character value of a corresponding character of the inventory string.

If all of the characters of a subset of the inventory string have character values that are greater than or equal to character values of corresponding characters of the request string, the string comparison module 132 can identify the subset of the inventory string as matching the request string. In some implementations, the string comparison module 132 can then determine, from the position of the characters of the subset in the inventory string, dates to which the characters of the subset correspond. The string comparison module can mark or otherwise indicate the dates as available.

After determining the first character of the inventory string of the subset that has been identified as matching the request string, the string comparison module 132 can proceed to identify other subsets that may match the request string. In some implementations, the string comparison module 132 can identify a character subsequent to the first character of the inventory string of the subset identified as matching the request string and repeat the process for identifying a subset of the inventory string that matches the request string. In some implementations, more than one subset of the inventory string can match the request string. In some implementations, the string comparison module 132 can identify the dates to which each of the matching subsets correspond. In some implementations, the string comparison module 132 can then provide the identified dates for display.

Existing string matching algorithms, such as the Knuth Moore Pratt string provided below, require that the character values in the request string and the inventory string be equal to one another to be considered a match. As such, such string matching algorithms as they currently exist do not work when trying to evaluate availability as described herein. Below is an implementation of the Knuth Moore Pratt string matching algorithm.

```
#include <iostream>
#include <vector>
using namespace std;
//----------------------------
//Returns a vector containing the zero based index of
// the start of each match of the string K in S.
// Matches may overlap
//----------------------------
vector<int> KMP(string S, string K)
{
    vector<int> T(K.size( ) +1, -1);
    vector<int> matches;
    if(K.size( ) == 0)
    {
        matches.push_back(0);
        return matches;
    }
    for(int i = 1; i <= K.size( ); i++)
    {
        int pos = T[i - 1];
        while(pos != -1 && K[pos] != K[i - 1])
        {
            pos = T[pos];
            T[i] = pos + 1;
        }
    }
    int sp = 0;
    int kp = 0;
    while(sp < S.size( ))
    {
        while(kp != -1 && (kp == K.size( ) || K[kp] != S[sp]))
        {
            kp = T[kp];
        }
        kp++;
        sp++;
        if(kp == K.size( )) matches.push_back(sp - K.size( ));
    }
    return matches;
}
```

The following algorithm is a modified version of the Knuth Moore Pratt string matching algorithm. The present algorithm introduces an "is_available" function that is used to return a match if the character value of the inventory string is greater than or equal to the request string.

```
#include <iostream>
#include <vector>
using namespace std;
bool is_available(char requested, char available)
{
    return requested > available;
}
vector<int> modified_kmp(string inventory, string request)
{
    vector<int> T(request.size( ) +1, -1);
    vector<int> matches;
    if(request.size( ) == 0)
    {
        matches.push_back(0);
        return matches;
    }
    for(int i = 1; i <= request.size( ); i++)
    {
        int pos = T[i - 1];
        while (pos != -1 && request[pos] != request[i - 1])
        {
            pos = T[pos];
            T[i] = pos + 1;
        }
    }
    int sp = 0;
```

```
        int kp = 0;
        while (sp < inventory.size( ))
        {
            while (kp != -1 && (kp == request.size( ) ||
        is_available(request[kp], inventory[sp])))
            {
                kp = T[kp];
            }
        }
        kp++;
        sp++;
        if(kp == request.size( ))
        {
            matches.push_back(sp - request.size( ));
        }
    }
    return matches;
}
```

The content reservation module 134 can be designed, configured or constructed to provide, for display, time units corresponding to the substrings identified by the string comparison module 132 as matching a request string corresponding to the request to identify availability of inventory of a content unit for a contiguous set of time units within a given date range. The content reservation module 134 can present the time units on a calendar interface. In some implementations, the calendar interface can include disparate slots for each time unit. The content reservation module 134 can identify, via a visual indicator, the available sequence of time units corresponding to the substring of the inventory string that matches the request string. In some implementations, slots of the available sequence of time units can be colored or include some other visual identifier. In some implementations, the content reservation module 134 can identify each of the available sequence of time units that correspond to a subset of the inventory string that matches the request string can be identified with a visual indicator. In some implementations, if multiple subsets of the inventory string match, the slots corresponding to the different available sequences of time units with different colors or visual markers. In some implementations, the content reservation module 134 can provide, for display, a first time unit, for example, a date, corresponding to the first character of each of the subsets of the inventory string that matches the request string.

In some implementations, the content reservation module 134 can receive a request to reserve a content item responsive to providing the results of the request to identify availability of inventory of a content unit for a contiguous set of time units within a given date range. In some implementations a content provider, such as an advertiser, may submit a request to reserve the content unit based on the availability of inventory of the content unit. In some implementations, the content reservation module 134 can receive the request and determine that the content unit has sufficient inventory for each of the time units for which to reserve the content unit. The content reservation module 134, upon determining that the content unit has sufficient inventory, can reserve the content unit for the amount of inventory requested. In some implementations, the content reservation module 134 can update a reservation schedule of the content unit to reflect the reservation. The reservation schedule of the content unit identifies the content providers or associated content items that correspond to reservations of the content unit. For instance, if a content unit is reserved for a particular time unit, for example, Jun. 23, 2014, by a first content publisher that reserved 30% of the inventory of the content unit and a second content publisher that reserved 70% of the inventory of the content unit, the reservation schedule of the content unit can include each of the content publishers and their corresponding amounts of inventory. Moreover, in some implementations, the reservation schedule can also identify one or more content items associated with each of the reservations, such that when a content serving opportunity for the first content provider arises, the content item associated with the reservation of the first content provider is provided for display.

The content serving module 136 can be designed, constructed or configured to select content to serve in a content unit. In some implementations, the content serving module 136 can determine a content item to select for serving in a content unit based on the reservation schedule of the content unit. The content serving module 136 can be configured to identify, from the reservation schedule of a content unit, a content item or a content provider for which a content item is to be displayed.

When a request to serve an information resource on which the content unit is received, a request to serve a content item in the content unit is generated. In some implementations, the content serving module 136 can receive the request to serve the content item. The request can identify the content item via a unique identifier identifying the content item. In some implementations, the request can include an identifier identifying the content item and a website address of the information resource with which the content unit is associated.

The content serving module 136, responsive to receiving the request, can determine one or more content providers for which content items can be served. In some implementations, the content serving module 136 can include a list of all of the content providers included in the reservation schedule for the given time unit. Upon identifying the list of candidate content providers, the content serving module 136 can determine their respective amounts of inventory reserved. The content serving module 136 can then perform a lookup in a log of content serving opportunities, a number of content items served for each of the candidate content providers. Based on the number of content items served and their respective reserved amounts of inventory, the content serving module 136 an determine which of the candidate content providers' content item to serve. For instance, using the example provided above, if the content serving module 136 determines that the content serving module 136 has served 2 impressions of a content item for the first content provider but only served 12 impressions of a content item for the second content provider, the content serving module 136 can determine to provide 2 more impressions of the content item for the second content provider before providing another impression of a content item for the first content provider (due to the 30% to 70% ratio).

The content serving module 136, responsive to determining the content provider whose content to serve, the content serving module 136 can retrieve or otherwise provide a content item for the determined content provider for display. The content serving module 136 can then update the log of content serving opportunities to increment the number of content serving opportunities for the determined content provider such that the next time a request to serve content for the content item is received, the content serving module 136 can again access the log to determine the content provider whose content to serve.

Figure 4:
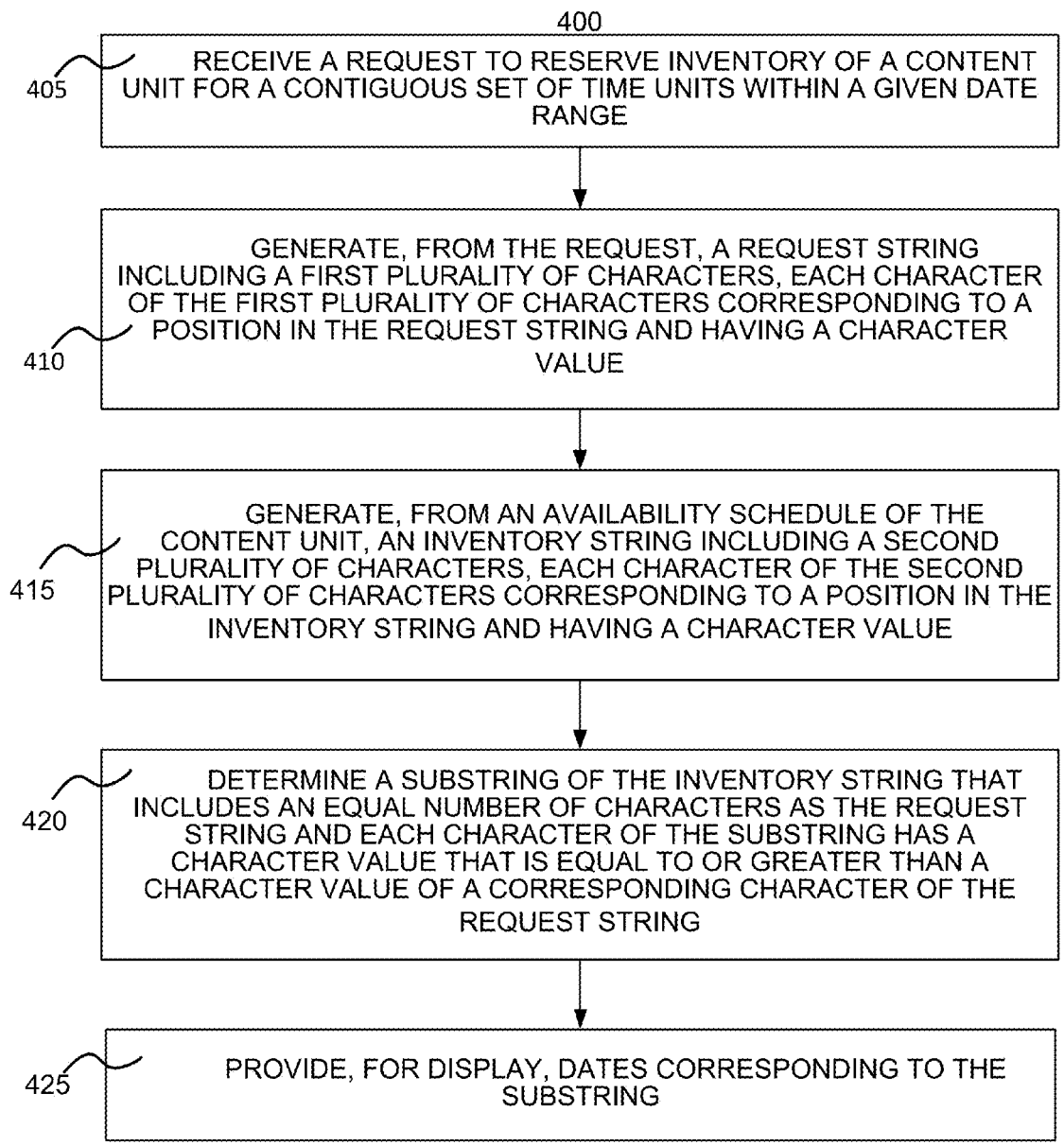
FIG. 4 is a flow diagram depicting one implementation of identifying availability of a content unit for a contiguous set of time units.

Referring now to FIG. 4, FIG. 4 is a flow diagram depicting one implementation of identifying availability of a content unit for a contiguous set of time units. The data processing system can receive a request to reserve inventory of a content unit for a contiguous set of time units within a given date range (BLOCK 405). The data processing system can generate, from the request, a request string including a first plurality of characters, each character of the first plurality of characters corresponding to a position in the request string and having a character value (BLOCK 410). The data processing system can generate, from an availability schedule of the content unit, a inventory string including a second plurality of characters, each character of the second plurality of characters corresponding to a position in the inventory string and having a character value. (BLOCK 415). The data processing system can then determine a substring of the inventory string that includes an equal number of characters as the request string and each character of the substring having a character value that is equal to or greater than a character value of a corresponding character of the request string (BLOCK 420). The data processing system can provide, for display, dates corresponding to the substring (BLOCK 425).

In further detail, the data processing system can receive a request to reserve inventory of a content unit for a contiguous set of time units within a given date range (BLOCK 405). As described above, the request can include one or more request parameters, including values corresponding to one or more of a time range field, a length of time field, a reservation portion size field, a domain name field and a content slot identifier field, among others. The request can be generated in response to receiving inputs via a user interface.

The data processing system can generate, from the request, a request string including a first plurality of characters, each character of the first plurality of characters corresponding to a position in the request string and having a character value (BLOCK 410). In some implementations, each character of the first plurality of characters may correspond to a position in the request string and may have a character value. In some implementations, the position of a character may correspond to a respective time unit of the contiguous set of time units. In some implementations, the character value may correspond to the reservation size value associated with the time unit to which the character corresponds.

In some implementations, the data processing system can assign, to each time unit, a character corresponding to the reservation size value of the time unit. For instance, depending on the granularity, the reservation portion size may assign a character value of A to a reservation portion size value of 10%, a character value of B to a reservation portion size value of 20%, a character value of C to a reservation portion size value of 30%, and so forth. In some implementations, the character values can be case sensitive. In some implementations, the character values can be numbers, symbols, among others. In some implementations, the character values can be selected from a-z, A-Z, 0-9, among other symbols and characters. Using the request depicted in FIG. 3, the data processing system can generate a request string "DEDEGGI," where each character D, E, D, E, G, G and I corresponds to the first, second, third, fourth, fifth, sixth and seventh time unit and the character value of D corresponds to 40%, the character value of E corresponds to 50%, the character value G corresponds to 70% and the character value of I corresponds to 90% of the inventory for a given time unit. The position of each character matches the position of the time unit of the request.

The data processing system can generate, from an availability schedule of the content unit, a inventory string including a second plurality of characters, each character of the second plurality of characters corresponding to a position in the inventory string and having a character value. (BLOCK 415). Each character of the second plurality of characters may correspond to a position in the inventory string. Each character of the second plurality of characters may also have a character value. The character value corresponds to a portion of the time unit that is available to be reserved. For instance, if a time unit has a value of D, 40% of the inventory of the time unit is available to be reserved, while 60% of the inventory of the time unit is unavailable. Similarly, if a time unit has a value of G, 70% of the inventory of the time unit is available to be reserved, while 30% of the inventory of the time unit is unavailable.

In some implementations, the data processing system can generate a reservation availability string that has a string length that is equal to the number of time units within the time range identified in the request. Each character in the reservation availability string can correspond to a particular time unit. In some implementations, the characters in the reservation availability string are positioned based on the temporal order of the time units to which the characters correspond. For instance, the first character corresponds to the first time unit within the time range, while the last character corresponds to the last time unit within the time range. To generate the reservation availability string, the data processing system can identify, for each time unit, a reservation availability of the time unit. In some implementations, the data processing system can identify the availability of inventory of the time unit by looking up a database that maintains the inventories of time units of a content slot. Upon determining the availability of inventory of a given time unit, the data processing system can assign a character corresponding to a reservation size value of the time unit. The reservation size value of the time unit is the size of the inventory of the time unit available to be reserved. The data processing system can assign a character for each time unit within the time range included in the request. In this way, the data processing system can generate the reservation availability string that has a string length that is equal to the number of time units within the time range identified in the request and each character in the reservation availability string indicates an size of inventory of the time unit available to be reserved.

The data processing system can then determine a substring of the inventory string that includes an equal number of characters as the request string and each character of the substring having a character value that is equal to or greater than a character value of a corresponding character of the request string (BLOCK 420). In some implementations, the data processing system can identify a first character of the request string. The data processing system can determine a character value corresponding to the first character of the request string. The data processing system can then determine, from the generated inventory string, the first character of the inventory string of the generated inventory string that has a character value that is equal to or greater than the first character value. In some implementations, the data processing system can determine the first character of the inventory string of the generated inventory string that has a character value that is equal to or greater than the first character value using an iterative process. The iterative process entails determining a first character of the inventory string of the inventory string, determining the character value of the determined character of the inventory string and comparing the determined character value with the character value of the first character of the request string, and repeating this for each subsequent character of the inventory string in the inventory string until the character value of the character of the inventory string has a character value that is equal to or greater than the character value of the first character of the request string.

In some implementations, after the data processing system identifies the first character of the inventory string that has a character value that is equal to or greater than the character value of the first character of the request string, the data processing system identifies the subsequent character of the inventory string adjacent to the first character of the inventory string. The data processing system can compare the character value of the subsequent character of the inventory string to a character value of the second character value of the request string. If the data processing system can determine that the character value of the subsequent character of the inventory string is equal to or greater than the character value of the second character value of the request string, the data processing system can repeat the steps of identifying the subsequent character of the inventory string adjacent to the most recently identified character of the inventory string, comparing the character value of the subsequent character of the inventory string to a character value of the corresponding character value of the request string and determining that the character value of the subsequent character of the inventory string is equal to or greater than the character value of the corresponding character value of the request string. The data processing system can repeat these steps until all of the characters of the request string have been compared or in the event that one of the character values of a character of the request string is greater than a character value of a character value of a corresponding character of the inventory string.

If all of the characters of a subset of the inventory string have character values that are greater than or equal to character values of corresponding characters of the request string, the data processing system can identify the subset of the inventory string as matching the request string. In some implementations, the data processing system can then determine, from the position of the characters of the subset in the inventory string, dates to which the characters of the subset correspond. The data processing system can mark or otherwise indicate the dates as available.

After determining the first character of the inventory string of the subset that has been identified as matching the request string, the data processing system can proceed to identify other subsets that may match the request string. In some implementations, the data processing system can identify a character subsequent to the first character of the inventory string of the subset identified as matching the request string and repeat the process for identifying a subset of the inventory string that matches the request string. In some implementations, more than one subset of the inventory string can match the request string. In some implementations, the data processing system can identify the dates to which each of the matching subsets correspond. In some implementations, the data processing system can then provide the identified dates for display.

The data processing system can provide, for display, dates corresponding to the substring (BLOCK 425). In some implementations, the data processing system can provide, for display, time units corresponding to the substrings identified by the data processing system as matching a request string corresponding to the request to identify availability of inventory of a content unit for a contiguous set of time units within a given date range. The data processing system can present the time units on a calendar interface. In some implementations, the calendar interface can include disparate slots for each time unit. The data processing system can identify, via a visual indicator, the available sequence of time units corresponding to the substring of the inventory string that matches the request string. In some implementations, slots of the available sequence of time units can be colored or include some other visual identifier. In some implementations, the data processing system can identify each of the available sequence of time units that correspond to a subset of the inventory string that matches the request string can be identified with a visual indicator. In some implementations, if multiple subsets of the inventory string match, the slots corresponding to the different available sequences of time units with different colors or visual markers. In some implementations, the data processing system can provide, for display, a first time unit, for example, a date, corresponding to the first character of each of the subsets of the inventory string that matches the request string.

Figure 5:
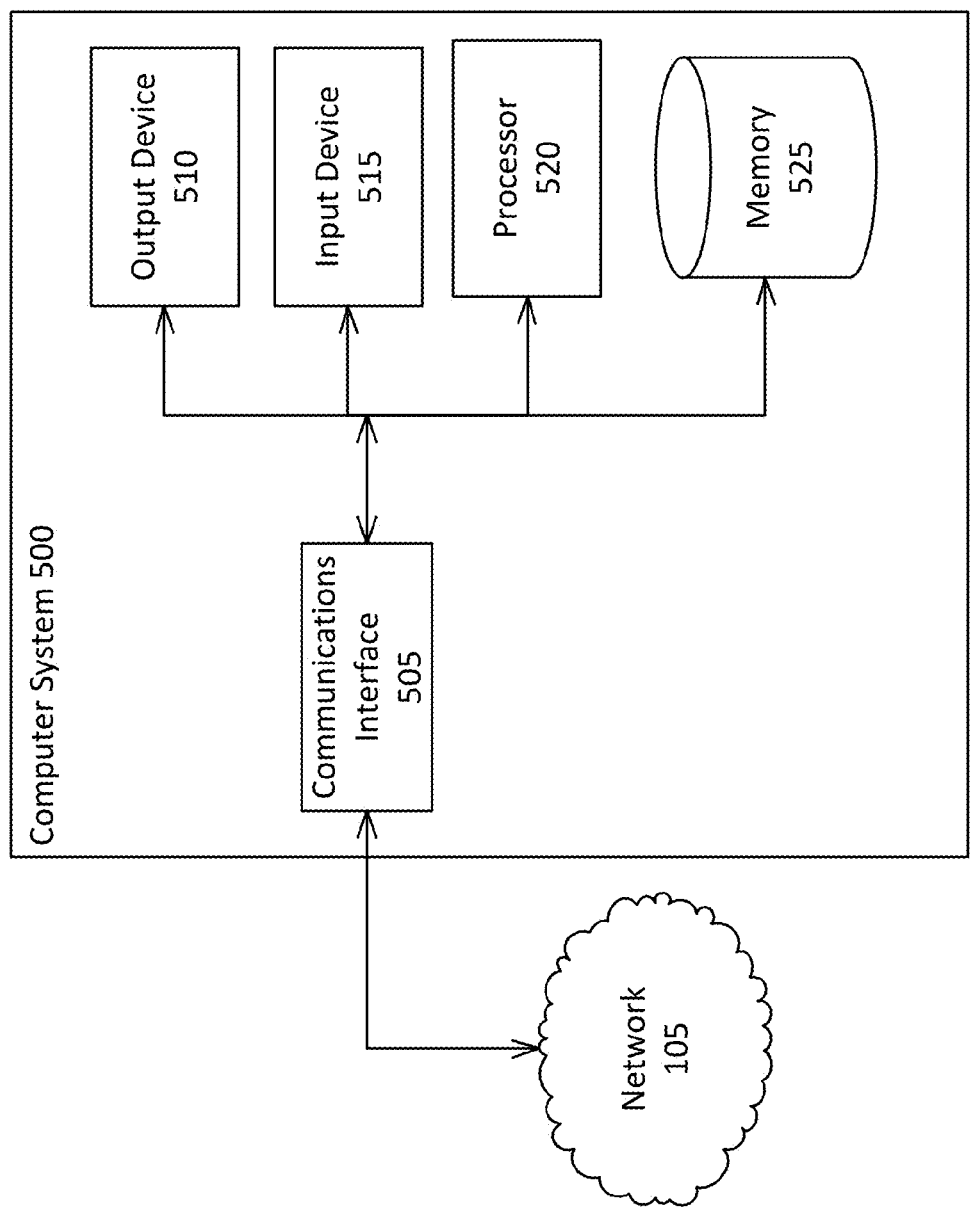
FIG. 5 is a block diagram illustrating an implementation of a general architecture for a computer system that may be employed to implement various elements of the systems and methods described and illustrated herein.

FIG. 5 shows the general architecture of an illustrative computer system 500 that may be employed to implement any of the computer systems discussed herein (including the system 50 and its components such as reservation availability string generation module 130, the string comparison module 132, the content reservation module 134 and the content serving module 136) in accordance with some implementations. The computer system 500 can be used to provide information via the network 55 for display. The computer system 500 of FIG. 5 comprises one or more processors 520 communicatively coupled to memory 525, one or more communications interfaces 505, and one or more output devices 510 (e.g., one or more display units) and one or more input devices 515. The processors 520 can be included in the data processing system 50 or the other components of the system 50 such as the reservation availability string generation module 130, the string comparison module 132, the content reservation module 134 and the content serving module 136.

In the computer system 500 of FIG. 5, the memory 525 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 50 of FIG. 1, the data processing system 50 can include the memory 525 to store information related to the availability of inventory of one or more content units, reservations of one or more content units, among others. The memory 525 can include the database 140. The processor(s) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or control the communications interface(s) 505 to transmit or receive various information pursuant to execution of instructions. For example, the communications interface(s) 505 may be coupled to a wired or wireless network, bus, or other communication means and may therefore allow the computer system 500 to transmit information to or receive information from other devices (e.g., other computer systems). While not shown explicitly in the system of FIG. 1, one or more communications interfaces facilitate information flow between the components of the system 50. In some implementations, the communications interface(s) may be configured (e.g., via various hardware components or software components) to provide a website as an access portal to at least some aspects of the computer system 500. Examples of communications interfaces 505 include user interfaces (e.g., web pages), through which the user can communicate with the data processing system 50.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The reservation availability string generation module 130, the string comparison module 132, the content reservation module 134 and the content serving module 136 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 500 or system 50 can include clients and servers. For example, the data processing system 50 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the reservation availability string generation module 130, the string comparison module 132, the content reservation module 134 and the content serving module 136 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to identifying the availability of inventory of content units, the systems and methods described herein can be applied to any program in any vertical in which a comparison is performed. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for identifying availability of a content unit for a contiguous set of time units, comprising:
    receiving, by a data processing system including one or more processors, a request to reserve inventory of a content unit for a contiguous set of time units within a given date range, the request identifying the date range and a reservation size value for each time unit corresponding to a size of a portion of the time unit to reserve;
    generating, by the data processing system, from the request, a request string including a first plurality of characters, each character of the first plurality of characters corresponding to a position in the request string and having a character value, the position corresponding to a respective time unit of the contiguous set of time units and the character value corresponding to the reservation size value associated with the time unit to which the character corresponds;
    generating, from an availability schedule of the content unit, an inventory string including a second plurality of characters, each character of the second plurality of characters corresponding to a position in the inventory string and having a character value, the position in the inventory string corresponding to a respective time unit of the date range and the character value representing a size of an available portion of the time unit;
    determining a substring of the inventory string that includes an equal number of characters as the request string and each character of the substring having a character value that is equal to or greater than a character value of a corresponding character of the request string; and
    providing, for display, dates corresponding to the substring.

2. The method of claim 1, wherein generating the request string from the request includes assigning, to each time unit, a character corresponding to the reservation size value of the time unit.

3. The method of claim 1, wherein the length of the inventory string is equal to a number of time units within the date range, each of the characters of the inventory string corresponding to a time unit within the date range.

4. The method of claim 1, wherein generating, from the availability schedule of the content unit, the inventory string including the second plurality of characters includes:
    identifying, for each time unit in the date range, a size of an available portion of the time unit that; and
    assigning a character corresponding to the size of the available portion of the time unit.

5. The method of claim 1, wherein determining a substring of the inventory string includes:
    identifying a first character of the request string;
    determining a character value corresponding to the first character of the request string; and
    determining a first character of the inventory string having a character value that is equal to or greater than the character value corresponding to the first character of the request string.

6. The method of claim 5, further comprising:
    identifying, for each subsequent character of the request string, a character value corresponding to the subsequent character;
    determining, for the subsequent character, a corresponding character of the inventory string based on a position of the character of the inventory string relative to the first character of the inventory string;
    determining, for the corresponding character of the inventory string, a character value that is equal to or greater than the character value of the character of the request string to which the character of the inventory string corresponds based on a position of the character of the request string relative to the first character of the request string.

7. The method of claim 1, wherein providing, for display, dates corresponding to the substring includes:
    identifying a first date corresponding to the first character of the substring; and
    providing, for display, the first date that is within the given date range.

8. A system for identifying availability of a content unit for a contiguous set of time units id described, comprising:

a data processing system comprising a memory storing processor-executable instructions; and a processor configured to execute the processor-executable instructions to receive a request to reserve inventory of a content unit for a contiguous set of time units within a given date range, the request identifying the date range and a reservation size value for each time unit corresponding to a size of a portion of the time unit to reserve;

generate, from the request, a request string including a first plurality of characters, each character of the first plurality of characters corresponding to a position in the request string and having a character value, the position corresponding to a respective time unit of the contiguous set of time units and the character value corresponding to the reservation size value associated with the time unit to which the character corresponds;

generate, from an availability schedule of the content unit, an inventory string including a second plurality of characters, each character of the second plurality of characters corresponding to a position in the inventory string and having a character value, the position in the inventory string corresponding to a respective time unit of the date range and the character value representing a size of an available portion of the time unit;

determine a sub string of the inventory string that includes an equal number of characters as the request string and each character of the sub string having a character value that is equal to or greater than a character value of a corresponding character of the request string; and provide, for display, dates corresponding to the substring.

9. The system of claim 8, wherein to generate the request string from the request, the processor is further configured to assign, to each time unit, a character corresponding to the reservation size value of the time unit.

10. The system of claim 8, wherein the length of the inventory string is equal to a number of time units within the date range, each of the characters of the inventory string corresponding to a time unit within the date range.

11. The system of claim 8, wherein to generate, from an availability schedule of the content unit, the inventory string including a second plurality of characters, the processor is further configured to:

identify, for each time unit in the date range, a size of an available portion of the time unit that; and assign a character corresponding to the size of the available portion of the time unit.

12. The system of claim 8, wherein to determine a substring of the inventory string, the processor is further configured to:

identify a first character of the request string;

determine a character value corresponding to the first character of the request string; and determine a first character of the inventory string having a character value that is equal to or greater than the character value corresponding to the first character of the request string.

13. The system of claim 12, wherein the processor is further configured to:

identify, for each subsequent character of the request string, a character value corresponding to the subsequent character;

determine, for the subsequent character, a corresponding character of the inventory string based on a position of the character of the inventory string relative to the first character of the inventory string;

determine, for the corresponding character of the inventory string, a character value that is equal to or greater than the character value of the character of the request string to which the character of the inventory string corresponds based on a position of the character of the request string relative to the first character of the request string.

14. The system of claim 8, wherein to provide, for display, dates corresponding to the substring, the processor is further configured to:

identify a first date corresponding to the first character of the substring; and provide, for display, the first date that is within the given date range.

15. A non-transitory computer-readable storage medium having instructions to provide information via a computer network, the instructions comprising instructions to:

receive a request to reserve inventory of a content unit for a contiguous set of time units within a given date range, the request identifying the date range and a reservation size value for each time unit corresponding to a size of a portion of the time unit to reserve;

generate, from the request, a request string including a first plurality of characters, each character of the first plurality of characters corresponding to a position in the request string and having a character value, the position corresponding to a respective time unit of the contiguous set of time units and the character value corresponding to the reservation size value associated with the time unit to which the character corresponds;

generate, from an availability schedule of the content unit, the inventory string including a second plurality of characters, each character of the second plurality of characters corresponding to a position in the inventory string and having a character value, the position in the inventory string corresponding to a respective time unit of the date range and the character value representing a size of an available portion of the time unit;

determine a sub string of the inventory string that includes an equal number of characters as the request string and each character of the sub string having a character value that is equal to or greater than a character value of a corresponding character of the request string; and provide, for display, dates corresponding to the substring.

16. The non-transitory computer-readable storage medium of claim 15, wherein generating the request string from the request includes assigning, to each time unit, a character corresponding to the reservation size value of the time unit.

17. The non-transitory computer-readable storage medium of claim 15, wherein the length of the inventory string is equal to a number of time units within the date range, each of the characters of the inventory string corresponding to a time unit within the date range.

18. The non-transitory computer-readable storage medium of claim 15, wherein generating, from the availability schedule of the content unit, the inventory string including the second plurality of characters includes:

identifying, for each time unit in the date range, a size of an available portion of the time unit that; and assigning a character corresponding to the size of the available portion of the time unit.

19. The non-transitory computer-readable storage medium of claim 15, wherein determining a substring of the inventory string includes:

identify a first character of the request string;

determine a character value corresponding to the first character of the request string; and determine a first character of the inventory string having a character value that is equal to or greater than the character value corresponding to the first character of the request string.

20. The non-transitory computer-readable storage medium of claim 15, wherein providing, for display, dates corresponding to the substring includes:

identify a first date corresponding to the first character of the substring; and provide, for display, the first date that is within the given date range.

\* \* \* \* \*